United States Patent Office 3,110,726
Patented Nov. 12, 1963

3,110,726
M-(1-CYCLOPROPYLETHYL)PHENYL
N-METHYLCARBAMATE
Joseph E. Moore, 3100 Pinole Valley Road, Pinole, Calif.; Joseph N. Ospenson, 2132 Dena Drive, Concord, Calif.; and Gustave K. Kohn, 671 Spruce St., Berkeley, Calif.
No Drawing. Filed Sept. 21, 1959, Ser. No. 841,035
1 Claim. (Cl. 260—479)

This invention relates to a new compound; namely, m-(1-cyclopropylethyl)phenyl N-methylcarbamate and its use as a cholinesterase inhibitor in agricultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely m-(1-cyclopropylethyl)phenyl N-methylcarbamate, whose antichloinesterase activity is markedly superior to one of its homologs which is recognized as one of the most active carbamate esters previously known. In fact, the cholinergic activity of the invention compound is of the order of three times as great as the activity of its homolog, namely, m-t-butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound m-(1-cyclopropylethyl)phenyl N-methylcarbamate, which is definitive of the following structural formula,

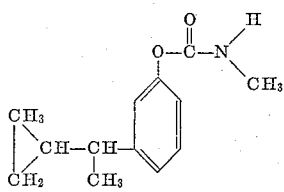

may be prepared (1) by reacting m-(1-cyclopropylethyl)-phenol with methylisocyanate or (2) by reacting m-(1-cyclopropylethyl)phenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning and the 1-cyclopropylethyl radical itself have been found essential to achieve the unique cholinergic activity of the resulting carbamate ester.

One of the methods of preparing the m-(1-cyclopropylethyl)phenol reactant involves the reaction of m-chlorophenyl magnesium bromide with methylcyclopropyl ketone to form m-chloro-α-cyclopropyl styrene followed by reduction to the m-(1-cyclopropylethyl)chlorobenzene. Hydrolysis of this compound results in the desired m-(1-cyclopropylethyl)phenol.

The following examples are illustrative of the preparation of the invention compound.

EXAMPLE I

Preparation of m-(1-Cyclopropylethyl)Phenol 12.7 grams of magnesium were slurried in 50 ml. of ether while 100 grams of 1-bromo-3-chlorobenzene in 250 ml. of ether were added at such a rate as to maintain gentle reflux. After the addition was completed, the temperature was lowered to 0° C. and a solution of 43.9 grams of methylcyclopropyl ketone in 100 ml. ether was added dropwise. The complex was finally destroyed by addition of 120 ml. of concentrated HCl in 200 ml. ice water. The ether phase was separated, washed with water, dried over sodium sulfate and stripped. The residual oil was treated with 3 drops of concentrated sulfuric acid and distilled. 80 grams of colorless oil boiling at 110–120° C. at 0.1 mm. Hg were obtained.

This material was hydrogenated by dissolving in 100 ml. of 95% ethanol containing 100 mg. $PtO_2$ and using an initial hydrogen pressure of 50 p.s.i. When no more hydrogen was absorbed, the catalyst was filtered and the solvent stripped. The crude oil (80 grams) was treated with 44.3 grams NaOH, 4.0 grams $Cu_2O$ and 300 ml. of water in a Monel bomb at 300° C. and 1700 p.s.i. pressure for six hours. After removal from the bomb, the oil phase was separated and discarded. The aqueous phase was acidified and the liberated oil extracted with ether; the ether solution was washed with water, dried over sodium sulfate and stripped. Distillation of the residual oil gave 7.0 grams of the desired m-(1-cyclopropylethyl)-phenol boiling at 90–100° C. at 0.1 mm. Hg.

EXAMPLE II

Preparation of m-(1-Cyclopropylethyl)Phenyl
N-Methylcarbamate 7.0 grams of the above phenol and 2.7 grams of methylisocyanate were sealed in a tube and heated at 100° C. for 24 hours. The resultant oil was distilled to yield 6 grams of the desired m-(1-cyclopropylethyl)phenyl N-methylcarbamate boiling at 140–147° C. at 0.1 mm. Hg. A nitrogen analysis showed 6.75% N as compared to a theoretical 6.39%.

In the application of the subject compound as a cholinesterase inhibitor, considerable variation in its formulation may be employed. Thus, m-(1-cyclopropylethyl)phenyl N-methylcarbamate may be applied per se or in combination with other active ingredients in both solid or liquid pesticidal formulations. As an example, m-(1-cyclopropylethyl)phenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at $25.0° \pm 0.1°$ C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman model G or equivalent pH meter.

The percent inhibition is then calculated from the pH values obtained for the blank, uninhibited enzyme, and the candidate inhibitor. A curve is then prepared by plotting on a semi-logarithmic graph paper the concentration of the inhibitor in gamma/ml. on the log scale versus percent inhibition on the linear scale. The curve will be S shaped. The concentration where the curve crosses the 50 percent inhibition mark is the $I_{50}$ value.

The superior cholinergic activity or cholinesterase inhibition of m-(1-cyclopropylethyl)phenyl N-methylcarbamate is attested by the following results in comparison with its homolog; namely, m-t-butylphenyl N-methylcarbamate.

| Compound: | $I_{50}$ |
|---|---|
| m-t-Butylphenyl N-methylcarbamate | 0.11 |
| m-(1-cyclopropylethyl)phenyl N-methylcarbamate | 0.04 |

Obviously, many modifications and variations of the invention as hereinbefore set forth may be made without departing from the spirit and scope thereof, and therefore only such limitations should be imposed as are indicated in the appended claim.

We claim:
m-(1-cyclopropylethyl)phenyl N-methylcarbamate.

References Cited in the file of this patent
UNITED STATES PATENTS

| 2,208,485 | Aeschlimann | July 16, 1940 |
| 2,362,508 | Stevens et al. | Nov. 14, 1944 |
| 2,677,698 | Deutschmann | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: J. Ag. Food Chem., 2, 864–870 (1954).